United States Patent
Heo et al.

(10) Patent No.: US 9,806,753 B2
(45) Date of Patent: Oct. 31, 2017

(54) NAVIGATION METHOD USING WEARABLE DEVICE IN VEHICLE AND VEHICLE CARRYING OUT THE SAME

(71) Applicant: HYUNDAI MOTOR COMPANY, Seoul (KR)

(72) Inventors: Keun Hang Heo, Yongin-si (KR); Sung Moon Yoon, Seoul (KR); Yong Ho Noh, Hwaseong-si (KR); Hyun Chul Sim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/275,834

(22) Filed: Sep. 26, 2016

(65) Prior Publication Data

US 2017/0134061 A1    May 11, 2017

(30) Foreign Application Priority Data

Nov. 9, 2015  (KR) ......................... 10-2015-0156828

(51) Int. Cl.
*H04W 4/02* (2009.01)
*H04B 1/3827* (2015.01)
(Continued)

(52) U.S. Cl.
CPC ............. *H04B 1/385* (2013.01); *H04L 67/26* (2013.01); *H04W 4/008* (2013.01)

(58) Field of Classification Search
CPC .... H04L 63/0846; H04W 12/06; G08B 21/18; G07C 5/0816; G07C 5/008; G01C 21/20;
(Continued)

(56) References Cited

U.S. PATENT DOCUMENTS

2015/0062086 A1* 3/2015 Nattukallingal ........ G06F 3/016
                                                                       345/175
2015/0134249 A1   5/2015 Yen
(Continued)

FOREIGN PATENT DOCUMENTS

JP    H11-183183 A    7/1999
JP    2001-141475 A    5/2001
(Continued)

OTHER PUBLICATIONS

Korean Office Action dated May 16, 2017, issued in corresponding Korean Patent Application No. 10-2015-0156828 (6 pages).

*Primary Examiner* — Phuoc H Doan
(74) *Attorney, Agent, or Firm* — Brinks Gilson & Lione

(57) ABSTRACT

The present disclosure relates to a method of providing navigation-related information to a driver using a wearable device worn by the driver in a vehicle, and a vehicle capable of carrying out the same. An audio video navigation (AVN) system for providing navigation information using wearable device, may include: a wireless communication unit for wirelessly exchanging data with an external device, and a controller for controlling the wireless communication unit to transmit a signal corresponding to an event occurring in a navigation function to the wearable device such that a notice of the event is output as vibration through the wearable device when the wearable device capable of delivering the vibration to a wearer is connected through the wireless communication unit and a preset destination setting condition is satisfied.

14 Claims, 3 Drawing Sheets

(51) Int. Cl.
*H04W 4/00* (2009.01)
*H04L 29/08* (2006.01)

(58) Field of Classification Search
CPC ... G06F 11/079; G06F 11/3495; H06F 11/302
USPC .................. 455/456.3; 701/410; 340/573.1;
345/175
See application file for complete search history.

(56) References Cited

U.S. PATENT DOCUMENTS

2016/0003623 A1* 1/2016 Venkatraman ......... G01C 21/20
701/410
2016/0335817 A1* 11/2016 Hatton .................. G07C 5/008

FOREIGN PATENT DOCUMENTS

| | | |
|---|---|---|
| JP | 2006-098244 A | 4/2006 |
| JP | 4983638 B2 | 5/2012 |
| KR | 10-2009-0043773 A | 5/2009 |
| KR | 10-2010-0041545 | 4/2010 |
| KR | 10-2010-0083371 A | 7/2010 |
| KR | 10-2012-0015186 A | 2/2012 |
| KR | 10-2012-0084510 A | 7/2012 |
| KR | 10-2015-0054453 A | 5/2015 |

* cited by examiner

110

120

130

NAVIGATION METHOD USING WEARABLE DEVICE IN VEHICLE AND VEHICLE CARRYING OUT THE SAME

This application claims priority to and the benefit of Korean Patent Application No. 10-2015-0156828, filed on Nov. 9, 2015, which is hereby incorporated by reference in its entirety.

FIELD

The present disclosure relates to a method of providing navigation-related information to a driver using a wearable device, and a vehicle capable of carrying out the same.

BACKGROUND

The statements in this section merely provide background information related to the present disclosure and may not constitute prior art.

Recently, propagation of a wearable device such as a smartwatch, etc. has explosively increased. Accordingly, research has been actively conducted on a service capable of enhancing driver convenience and safety by linking a wearable device to a vehicle.

Meanwhile, when a driver drives a vehicle while using navigation and radio/music reproduction functions of the vehicle, the driver experiences inconvenience as below.

A navigation system gives a notice of turning right/left, etc. and a warning against a speed bump, speeding, etc. through sound. Therefore, when a function accompanied by sound output such as radio/music reproduction, etc. is used, sound listening is disturbed by the notice/warning of the navigation system. Furthermore, in general, in most vehicles, a volume of sound output is decreased when a navigation warning/notice is generated. Thus, sound listening becomes seriously inconvenient in a region in which a warning/notice is frequently generated such as a region in which a speed bump frequently appears.

SUMMARY

The present disclosure provides a vehicle capable of outputting navigation-related information through a linked wearable device by being linked to the wearable device, and a method of controlling the same that substantially obviates one or more problems due to limitations and disadvantages of the related art.

Technical problems to be solved by the present disclosure are not limited to the above-mentioned technical problems, and other technical problems not mentioned herein may be clearly understood by those skilled in the art from description below.

The present disclosure provides an audio video navigation (AVN) system for providing navigation information using a wearable device, which includes: a wireless communication unit for wirelessly exchanging data with an external device; and a controller for controlling the wireless communication unit to transmit a signal corresponding to at least one event occurring in a navigation function to the wearable device such that a notice of the at least one event is output as a vibration through the wearable device when the wearable device capable of delivering the vibration to a wearer is connected through the wireless communication unit and a preset destination setting condition is satisfied.

The vibration output through the wearable device may be in a different pattern according to type of the at least one event.

The AVN system may further include a speaker, and the controller may mute a notice sound through the speaker and the vibration in response to the at least one event is generated through the wearable device.

In one form, the controller may allow the speaker to output a sound in response to the at least one event output while the vibration through the wearable device is output.

The preset destination setting condition is satisfied when:
a destination set through the AVN system is identical to an immediately previously set destination,
a destination set through the AVN system was previously set a predetermined number of times for a certain period of time, or
a destination set through the AVN system is stored as a particular name.

In another form, the controller performs a control operation such that a notice of an event of a preset type is delivered only by a vibration through the wearable device when the preset destination setting condition is not satisfied.

The at least one event includes at least one of a direction change notice, a crackdown information notice, or a safety precaution region notice.

A vehicle may include the AVN system as described above.

In another aspect of the present disclosure, a method of controlling an AVN system for providing navigation information using a wearable device, includes setting a destination, and transmitting a signal corresponding to at least one event occurring in a navigation function to the wearable device such that a notice of the at least one event is output as a vibration through the wearable device when the set destination satisfies a preset destination setting condition and the wearable device capable of delivering the vibration to a wearer is connected.

The vibration output through the wearable device is output in a different pattern according to type of the at least one event.

The method further comprises:
muting a notice sound of a speaker, and
generating vibration corresponding to the at least one event through the wearable device.

A notice sound in response to the at least one event is output through a speaker while the vibration through the wearable device is output.

The method further comprises:
transmitting a signal corresponding to an event of a preset type to the wearable device such that a notice of the event of the preset type is output as a vibration through the wearable device when the preset destination setting condition is not satisfied.

A computer-readable recording medium stores a program for executing the method described above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
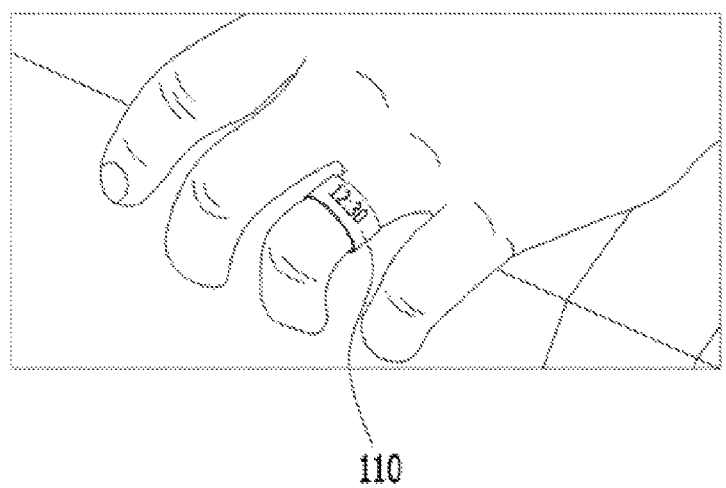
FIGS. 1A to 1C are diagrams illustrating wearable devices to which forms of the present disclosure are applicable.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The suffixes "module" and "unit" of elements herein are used for convenience of description and thus can be used interchangeably and do not have any distinguishable meanings or functions.

In addition, when known technology related to description of the forms disclosed in the specification is determined to obscure the subject matter of the forms disclosed in the specification, a detailed description thereof is omitted. Further, the accompanying drawings merely aid in understanding of the forms disclosed in the specification, and does not restrict a technical spirit disclosed in the specification. Furthermore, it should be understood that the present disclosure includes all modifications, equivalents, and substitutes within the spirit and the scope of the present disclosure.

Prior to description of forms of the present disclosure, wearable devices applicable to the forms will be described.

Figure 1B:
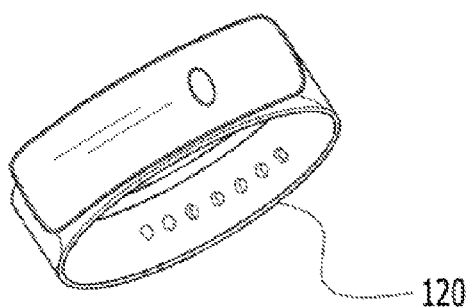
Figure 1C:
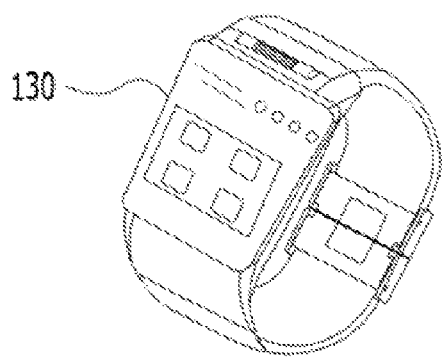

FIGS. 1A to 1C illustrate wearable devices to which forms of the present disclosure are applicable.

Referring to FIGS. 1A to 1C, examples of a wearable device wearable around a finger may include a smart ring 110 as in FIG. 1A, and examples of a wearable device wearable around a wrist may include a smart bracelet 120 as in FIG. 1B and a smartwatch 130 as in FIG. 1C.

Types of wearable devices illustrated in FIGS. 1A to 1C are illustrative, and the present disclosure is not limited thereto. The present disclosure is not limited by any type such as a glass type, a necklace type, etc. when a wearable device of the type can be worn on a part of a body of a driver to deliver information to the driver through a sense of touch. Therefore, the wearable devices to be applied to the forms of the present disclosure may include at least one wireless communication unit for exchanging wireless data with a vehicle, a means (for example, a vibration generator) for delivering information to a wearer through a sense of touch, and a controller (e.g., a processor) for controlling the wireless communication unit and the means. In one form, the wireless communication unit may support at least one near field communication scheme such as Bluetooth, Wi-Fi, etc. In addition, the vehicle and the wearable device may be directly connected to each other, and may be connected through a smart device such as a smartphone, etc.

When the wearable device is wirelessly connected to the vehicle such that information can be exchanged, a warning sound or a guide voice to be output through a navigation system is replaced with vibration and delivered to the driver through the wearable device instead of being output through a vehicle speaker. In this instance, a vibration pattern of the wearable device may be differently set according to type of navigation-related information. For example, the strength or frequency or the like of the vibration may vary according to the type of the navigation-related information. In addition, a function of outputting the navigation-related information through the wearable device in place of the vehicle speaker may be differently performed according to a destination set in the navigation system.

For example, when a destination set in the navigation system is a destination familiar to the driver or found in the history of the navigation system (e.g., when the destination was set multiple times during a predetermined period of time, when a current driving path is the same as an immediately previous driving path, or when a home or an office is designated as the destination, etc.), sound output related to navigation may be fully muted, and the navigation-related information may be delivered to the driver only through the wearable device. On the other hand, when a destination set in the navigation system has not been set before, at least a partial warning sound or a guide voice (turning right/left, U-turn, etc.) may be controlled to be output through the vehicle speaker according to setting.

In one form, when no destination is input to the navigation system, only vibration may be controlled to be output through the wearable device at all times. In another form, a guide voice or a warning sound may be controlled to be output through the vehicle speaker at all times for an event (for example, appearance of a speed bump) preset by a user irrespective of whether a destination is familiar to the driver or whether a navigation destination is set.

In still another form, even when sound is output through the navigation system, a vibration output through the wearable device may be accompanied according to setting.

A path set in the navigation system is input to reflect the driver's desire to listen to music/the radio rather than a warning/notice of the navigation system when the driver drives along a familiar path.

Hereinafter, a description will be given of a system for performing a method of providing navigation information according to the present form with reference to FIG. 2.

Figure 2:
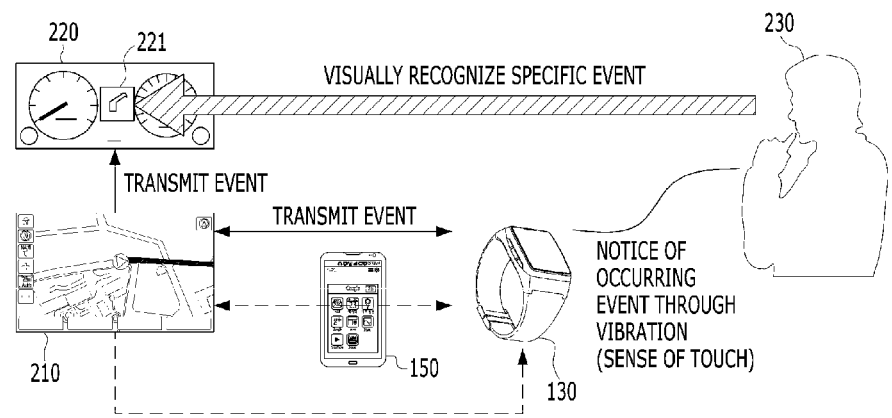
FIG. 2 is a diagram illustrating one form of a system configuration for performing a method of providing navigation information using a wearable device.

FIG. 2 illustrates an example of a system configuration for performing the method of providing navigation information using the wearable device according to the present disclosure.

Referring to FIG. 2, the system includes an audio video navigation (AVN) system 210 for providing a navigation function and a wearable device 130 configured to exchange data. The AVN system 210 and the wearable device 130 may be directly linked to each other using a wireless communication protocol such as Bluetooth, or may be connected through another smart device such as a smartphone 150. This linkage scheme is illustrative, and those skilled in the art would apply any connection scheme appropriate for data exchange between the AVN system 210 and the wearable device 130. In addition, a cluster 220 needs to be able to receive data transmitted by the navigation system, and in one form, the cluster 220 be able to visually express the received data as a symbol 221.

When an event occurs in the navigation system, information related to the event may be transmitted to the wearable device 130 and the cluster 220 from the AVN system 210. The wearable device 130 receiving the information from the navigation system informs the driver of the occurrence of the event by generating vibration. In this instance, the wearable device 130 may output vibration of a different pattern according to type or characteristic of the event. The cluster 220 may display information received from the navigation system as the symbol 221 on a display. In this way, the driver may visually recognize a warning/notice of the navigation system.

Here, the event may include a direction change notice, a crackdown information notice, or a safety precaution region notice, etc. Examples of the event may include appearance of a speed bump in front of the vehicle, appearance of a speed detection camera, or appearance of an intersection accompanied by direction change, etc.

Figure 3:
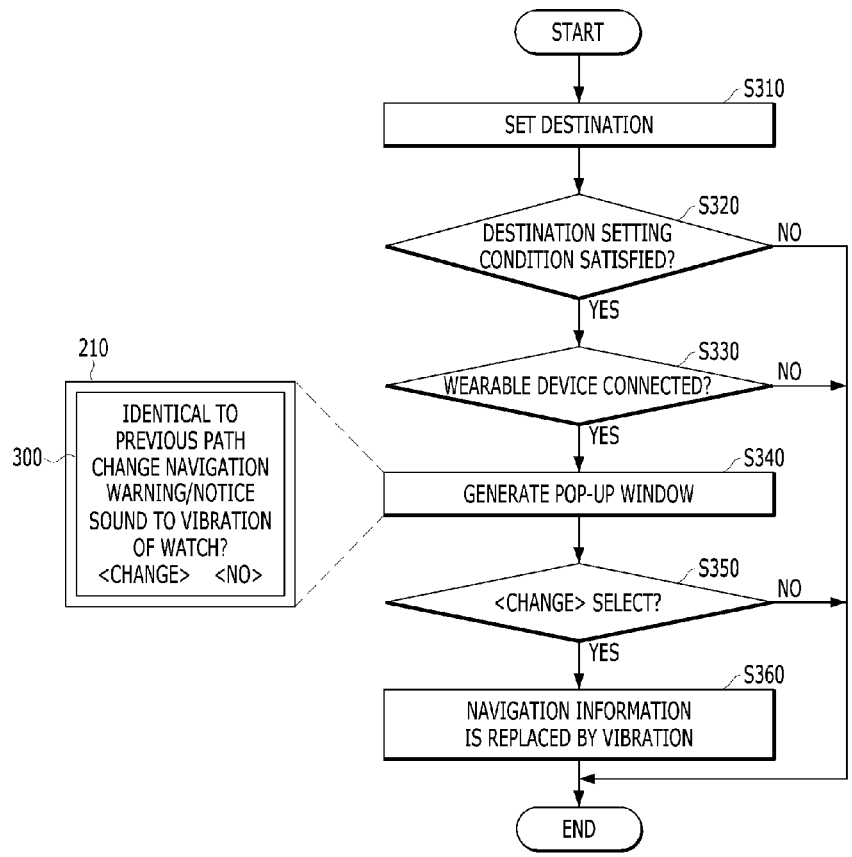
FIG. 3 is a flowchart illustrating one form of a process of outputting navigation-related information using the wearable device in a vehicle.

FIG. 3 illustrates an example of a process of outputting navigation-related information using the wearable device in the vehicle according to the present disclosure.

Referring to FIG. 3, first, a navigation destination may be set through the AVN system 210 of the vehicle in S310. When a preset destination setting condition is satisfied in S320, and when the wearable device is in a connected state in S330, the AVN system 210 may perform a control operation such that a pop-up window 300 for receiving a verification from the driver as to whether to output the navigation-related information through the connected wearable device may be displayed through the AVN system 210 in S340. Here, when the driver selects to output the navigation-related information as vibration through the wearable device in S350, the navigation-related information may be delivered in a form of vibration through the wearable device instead of a sound through the vehicle speaker in S360.

The preset destination setting condition in the above-described process may include: a case in which a previously set path corresponds to a new destination, a case in which the destination was previously set a predetermined number of times or more during a certain period of time, a case in which the destination is stored as a particular name such as a home or an office. In one form, even when no destination is designated or the destination setting condition is not satisfied, if a notice of an event of a preset type is previously set to be converted and output through the wearable device, the notice of the event of the type may be output as vibration through the wearable device.

Further, according to setting, even when no destination is designated or the destination setting condition is not satisfied, if the wearable device is connected, the navigation-related information may be converted and output vibration through the wearable device.

Hereinafter, a description will be given of an AVN system configuration for implementing the above-described forms.

Figure 4:
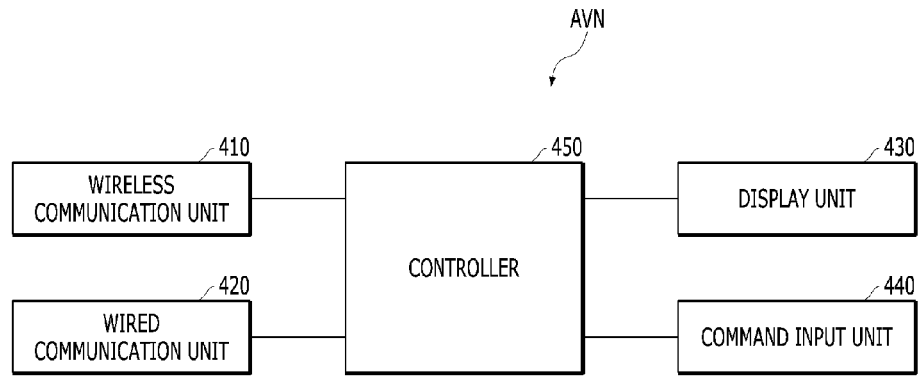
FIG. 4 is a block diagram illustrating one form of an audio video navigation (AVN) system configuration.

FIG. 4 illustrates an example of the AVN system configuration according to one form of the present disclosure.

Referring to FIG. 4, an AVN system of a vehicle may include a wireless communication unit 410 connected to a wearable device to exchange various control signals and direction information of interest using a wireless communication scheme such as Bluetooth, Wi-Fi, etc., a wired communication unit 420 for exchanging a signal with another controller of the vehicle such as a cluster, etc., a display unit 430 for displaying a list of various functions, an execution image, and a navigation image, a command input unit 440 such as a touch pad, a key button, etc. for receiving a command from a driver, and a controller 450 for controlling the above-described components and performing determination and operation necessary for implementation of the present disclosure. For example, the controller 450 may control the wireless communication unit 410 such that a process of being wirelessly connected to the wearable device is performed. In particular, the controller 450 may control the wireless communication unit 410 such that a signal corresponding to a navigation event is transmitted to the connected wearable device when a preset destination setting condition is satisfied.

The configuration of FIG. 4 is illustrative, and those skilled in the art would add more or fewer components if desired. For example, the wireless communication unit 410 may be included in a controller outside the AVN system, it is possible to further include a sound output unit for outputting multimedia, a navigation guide voice, a warning sound, etc.

As described in the foregoing, in the forms of the present disclosure, an existing navigation warning/notice, which has been delivered to a driver through an auditory sense, may be delivered through a sense of touch in place of the auditory sense. Visual information may be maintained in the AVN system without change, and additional visual information may be displayed on a cluster according to vehicle. In this way, it is possible to resolve inconvenience experienced by the driver when using an infotainment system such as radio/music reproduction, etc.

According to at least one form of the present disclosure, there are effects as below.

Navigation-related information is delivered to a driver through a wearable device worn by the driver, and thus convenience in sound listening may be significantly improved.

In addition, navigation-related information is selectively delivered to a driver through a wearable device according to experience or skill of the driver with respect to a driving path, and thus influence on safety is reduced.

Effects that may be obtained from the present disclosure are not limited to the above-mentioned effects, and other effects not mentioned herein may be clearly understood by those skilled in the art from the above description.

The above-described present disclosure may be implemented as computer-readable code in a medium in which a program is recorded. A computer-readable medium includes all types of recording devices in which data readable by a computer system is stored. Examples of the computer-readable medium include a hard disk drive (HDD), a solid state disk (SSD), a silicon disk drive (SDD), a read only memory (ROM), a random access memory (RAM), a CD-ROM, a magnetic tape, a floppy disk, an optical data storage device, etc. In addition, the computer-readable medium may also be implemented in the form of a carrier wave (for example, transmission over the Internet).

The above exemplary forms are therefore to be construed in all aspects as illustrative and not restrictive. The scope of the present disclosure should be determined by the appended claims and their legal equivalents, not by the above description, and all changes coming within the meaning and equivalency range of the appended claims are to be embraced therein.

What is claimed is:

1. An audio video navigation (AVN) system for providing navigation information using a wearable device, comprising:
   a wireless communication unit configured to wirelessly exchange data with an external device; and
   a controller configured to control the wireless communication unit to transmit a signal corresponding to at least one event occurring in a navigation function to the wearable device such that a notice of the at least one event is output as a vibration through the wearable device when the wearable device capable of delivering the vibration to a wearer is connected through the wireless communication unit and a preset destination setting condition is satisfied, wherein the preset destination setting condition is satisfied when:
- a destination set through the AVN system is identical to an immediately previously set destination,
- a destination set through the AVN system was previously set a predetermined number of times for a certain period of time, or
- a destination set through the AVN system is stored as a particular name.

2. The AVN system according to claim 1, wherein the vibration output through the wearable device is output in a different pattern according to type of the at least one event.

3. The AVN system according to claim 1, further comprising a speaker,
wherein the controller is configured to perform a control operation such that a notice sound through the speaker becomes mute and the vibration in response to the at least one event is generated through the wearable device.

4. The AVN system according to claim 1, wherein the controller is configured to allow a speaker to output a sound in response to the at least one event output while the vibration through the wearable device is output.

5. The AVN system according to claim 1, wherein the controller is configured to perform a control operation such that a notice of an event of a preset type is delivered only by a vibration through the wearable device when the preset destination setting condition is not satisfied.

6. The AVN system according to claim 1, wherein the at least one event includes at least one of a direction change notice, a crackdown information notice, or a safety precaution region notice.

7. A vehicle including the AVN system according to claim 1.

8. A method of controlling an audio video navigation (AVN) system for providing navigation information using a wearable device, comprising:
setting a destination; and
transmitting a signal corresponding to at least one event occurring in a navigation function to the wearable device such that a notice of the at least one event is output as a vibration through the wearable device when the set destination satisfies a preset destination setting condition and the wearable device capable of delivering the vibration to a wearer is connected,
wherein the preset destination setting condition is satisfied when:
- the set destination is identical to an immediately previously set destination,
- the set destination is previously set a predetermined number of times or more for a certain period of time, and
- the set destination is stored with a particular name.

9. The method according to claim 8, wherein the vibration output through the wearable device is output in a different pattern according to type of the at least one event.

10. The method according to claim 9, further comprising:
muting a notice sound of a speaker, and
generating vibration corresponding to the at least one event through the wearable device.

11. The method according to claim 8, wherein a notice sound in response to the at least one event is output through a speaker while the vibration through the wearable device is output.

12. The method according to claim 8, further comprising
transmitting a signal corresponding to an event of a preset type to the wearable device such that a notice of the event of the preset type is output as a vibration through the wearable device when the preset destination setting condition is not satisfied.

13. The method according to claim 8, wherein the at least one event includes at least one of a direction change notice, a crackdown information notice, or a safety precaution region notice.

14. A non-transitory computer-readable recording medium storing a program for executing the method according to claim 8.

* * * * *